(12) United States Patent
Thanh Ly

(10) Patent No.: US 11,680,732 B2
(45) Date of Patent: Jun. 20, 2023

(54) SOLAR POWERED WATER HEATING ASSEMBLY

(71) Applicant: Bill Thanh Ly, Orange, CA (US)

(72) Inventor: Bill Thanh Ly, Orange, CA (US)

( * ) Notice: Subject to any disclaimer, the term of this patent is extended or adjusted under 35 U.S.C. 154(b) by 233 days.

(21) Appl. No.: 17/108,054

(22) Filed: Dec. 1, 2020

(65) Prior Publication Data

US 2022/0170668 A1    Jun. 2, 2022

(51) Int. Cl.
*F24H 9/20* (2022.01)
*H02S 20/32* (2014.01)
*H02S 40/38* (2014.01)
*F24H 1/10* (2022.01)

(52) U.S. Cl.
CPC ........... *F24H 9/2028* (2013.01); *F24H 1/105* (2013.01); *H02S 20/32* (2014.12); *H02S 40/38* (2014.12)

(58) Field of Classification Search
CPC ............... F24H 2250/08; H02S 40/38–425
See application file for complete search history.

(56) References Cited

U.S. PATENT DOCUMENTS

| | | | |
|---|---|---|---|
| 2,879,372 A | 3/1959 | Dammond | |
| 3,378,673 A | 4/1968 | Hopper | |
| 5,933,574 A | 8/1999 | Avansino | |
| 8,840,041 B2 | 9/2014 | Martinez | |
| D801,496 S | 10/2017 | Letham | |
| 2008/0308091 A1* | 12/2008 | Corio | F24S 30/425 126/606 |
| 2011/0005580 A1* | 1/2011 | Vandermeulen | H02S 40/44 126/609 |
| 2011/0315676 A1* | 12/2011 | Yang | F24H 1/208 392/441 |
| 2012/0125913 A1 | 5/2012 | Song | |
| 2014/0069540 A1 | 3/2014 | Chesnais | |
| 2014/0251419 A1* | 9/2014 | Samii | F24S 10/00 438/98 |
| 2015/0060437 A1* | 3/2015 | Karch | H05B 6/105 219/634 |
| 2015/0233604 A1* | 8/2015 | Gaspard | H05B 6/108 219/628 |
| 2019/0285312 A1* | 9/2019 | Goodjohn | F24H 9/2021 |

FOREIGN PATENT DOCUMENTS

CN    2382922 Y  *  6/2000
JP    01115075 A  *  5/1989

* cited by examiner

*Primary Examiner* — Ryan S Cannon

(57) ABSTRACT

A solar powered water heating assembly for supplying hot water from an exterior faucet or pipe includes a heating unit and a solar panel. The heating unit is integral to, or can be engaged to, a pipe that is in fluidic communication with water piping of a structure. The pipe extends externally from the structure. The heating unit is positioned to heat water flowing through the pipe. The solar panel converts electromagnetic radiation into an electrical current. The solar panel is operationally engaged to the heating unit and thus is positioned to power the heating unit to heat the water flowing through the pipe.

7 Claims, 4 Drawing Sheets

SOLAR POWERED WATER HEATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to water heating assemblies and more particularly pertains to a new water heating assembly for supplying hot water from an exterior faucet or pipe.

The present invention discloses a water heating assembly comprising a solar panel powered heating unit integral to, or configured to engage, an exterior pipe to heat water flowing therethrough.

(2) Description of Related Art Including Information Disclosed Under 37 CFR 1.97 and 1.98

The prior art relates to water heating assemblies. Prior art water heating assemblies may comprise flow through heat exchangers, hoses with integral heaters, heat tapes or heat sleeves affixable to hoses, and tankless water heaters. What is lacking in the prior art is a solar panel powered heating unit integral to, or configured to engage, an exterior pipe to heat water flowing therethrough.

BRIEF SUMMARY OF THE INVENTION

An embodiment of the disclosure meets the needs presented above by generally comprising a heating unit and a solar panel. The heating unit is integral to, or configured to be engaged to, a pipe that is in fluidic communication with water piping of a structure. The pipe extends externally from the structure. The heating unit is positioned to heat water flowing through the pipe. The solar panel is configured to convert electromagnetic radiation into an electrical current. The solar panel is operationally engaged to the heating unit and thus is positioned to power the heating unit to heat the water flowing through the pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
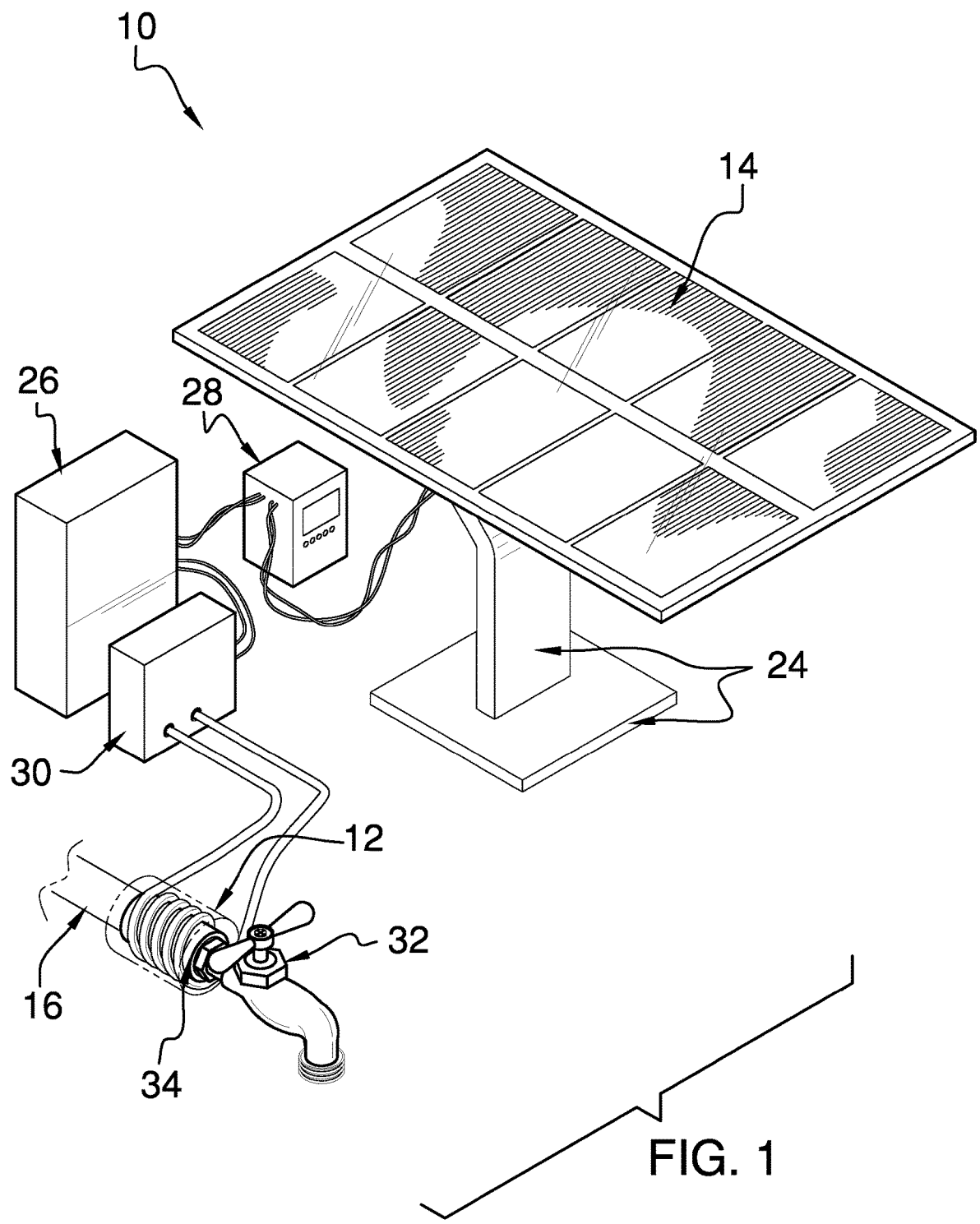
FIG. 1 is an in-use view of a solar powered water heating assembly according to an embodiment of the disclosure.
Figure 2:
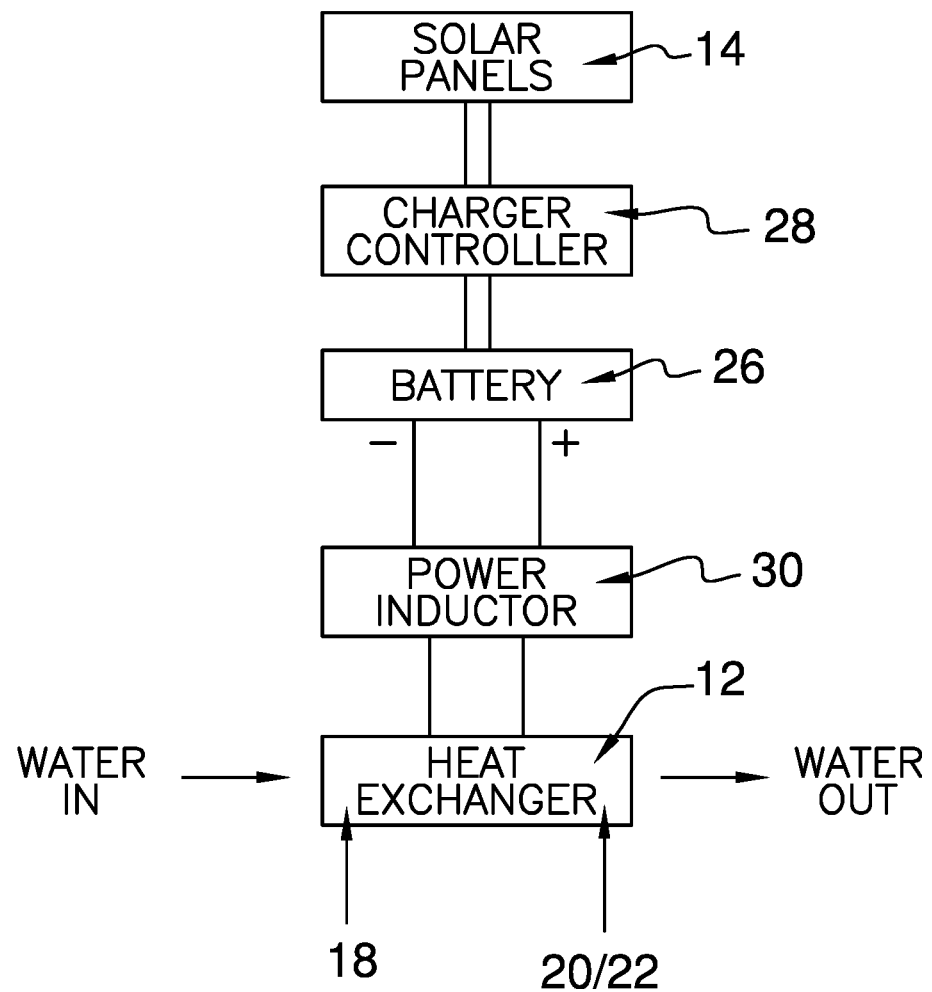
FIG. 2 is a block diagram of an embodiment of the disclosure.

With reference now to the drawings, and in particular to FIGS. 1 through 4 thereof, a new water heating assembly embodying the principles and concepts of an embodiment of the disclosure and generally designated by the reference numeral 10 will be described.

As best illustrated in FIGS. 1 through 4, the solar powered water heating assembly 10 generally comprises a heating unit 12 and a solar panel 14. The heating unit 12 is integral to, or configured to be engaged to, a pipe 16 that is in fluidic communication with water piping of a structure. The pipe 16 extends externally from the structure. The heating unit 12 is positioned to heat water flowing through the pipe 16.

Figure 3:
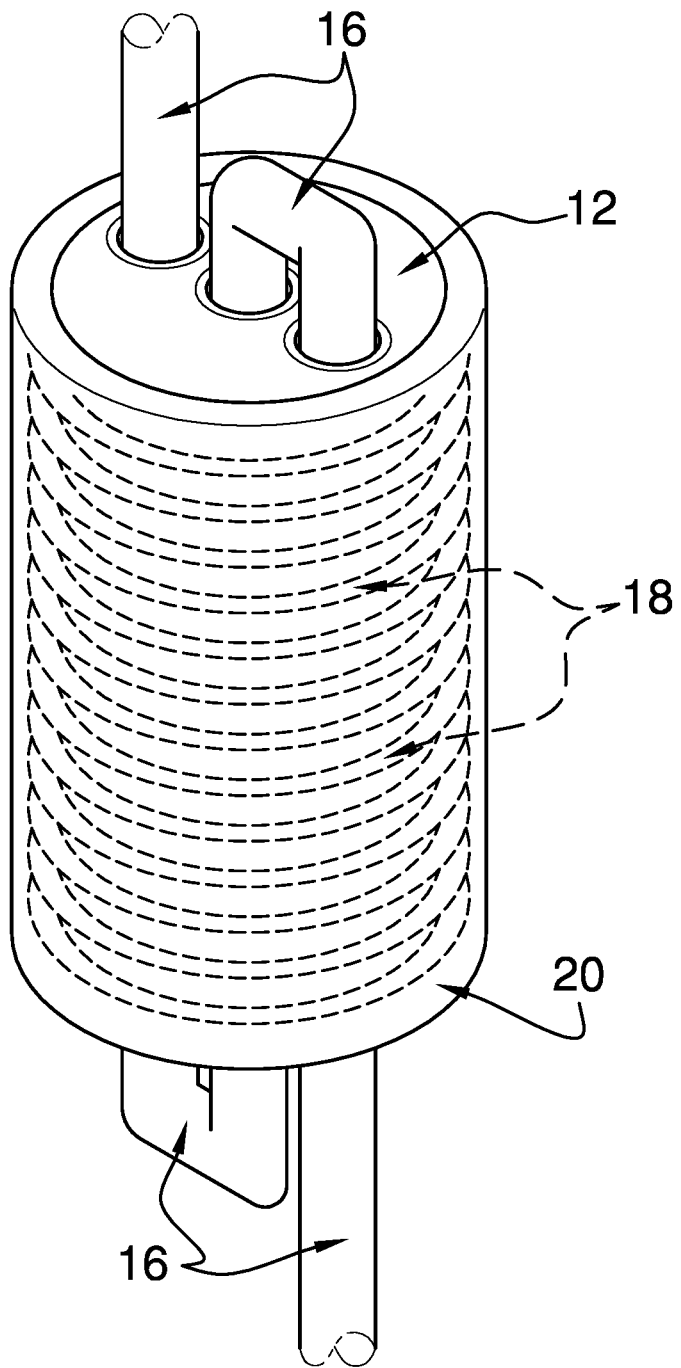
FIG. 3 is an isometric perspective view of an alternative embodiment of the disclosure.
Figure 4:
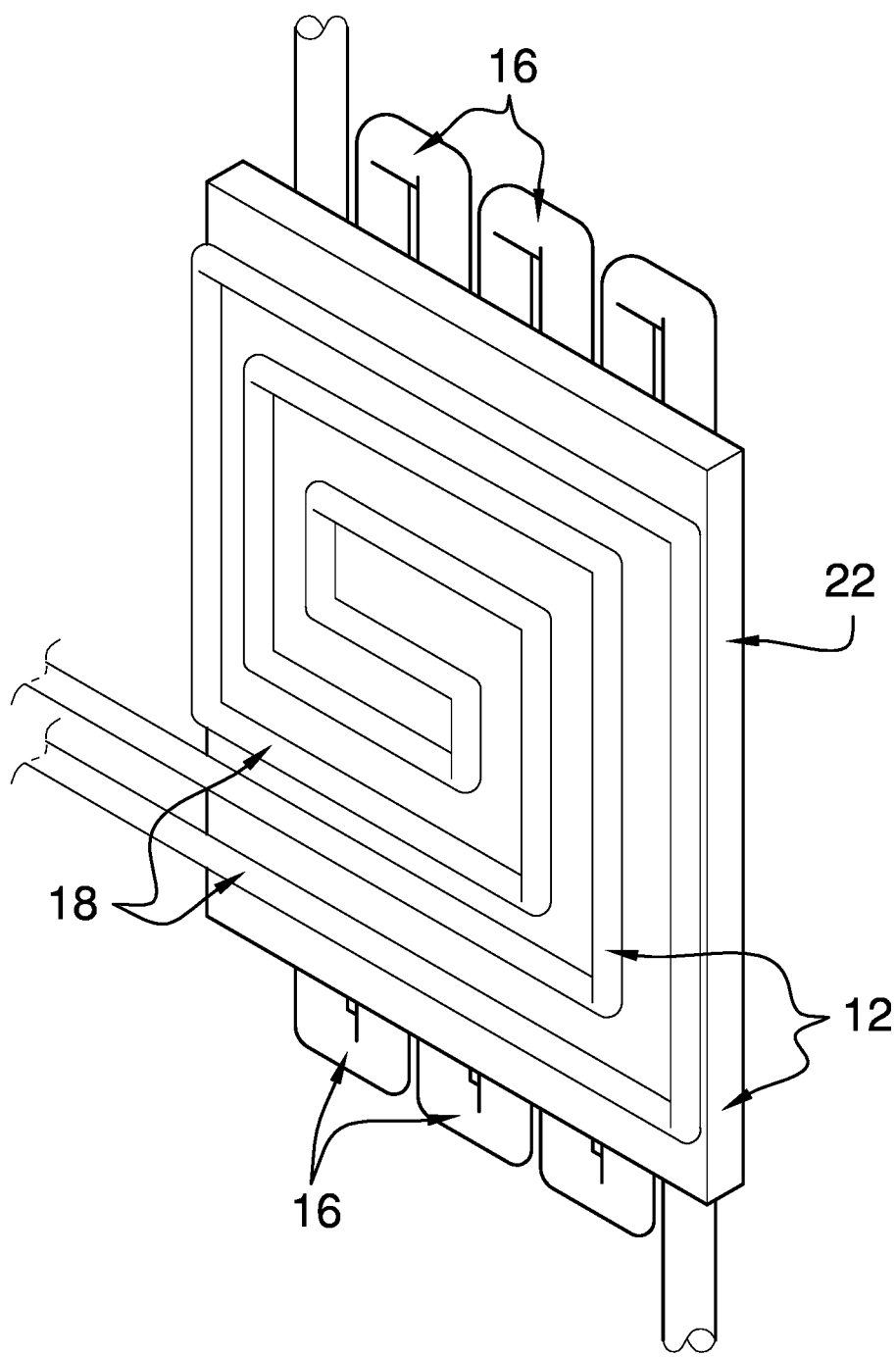
FIG. 4 is an isometric perspective view of an alternative embodiment of the disclosure.

The heating unit 12 may comprise an inductor 18, which is engaged to a tube 20, as shown in FIGS. 1 and 3, or to a plate 22, as shown in FIG. 4. The tube 20 or the plate 22 is paramagnetic and in contact with the pipe 16. The inductor 18 is positioned to generate a magnetic field to induce eddy currents within the tube 20 or the plate 22 for heating thereof. The tube 20 or the plate 22 is configured to transfer heat to the pipe 16 to heat the water flowing therethrough. The tube 20 or the plate 22 comprises iron.

As is known to those skilled in the art of inductive heating, inductive heating can be effected in by a variety of methods, with each method utilizing associated components. The present invention anticipates the heating unit 12 comprising components required to effect inductive heating by any of the variety of methods. The present invention also anticipates the heating unit 12 comprising other heating means, such as, but not limited to, heating elements and the like.

The solar panel 14 is configured to convert electromagnetic radiation into an electrical current. The solar panel 14 is operationally engaged to the heating unit 12 and thus is positioned to power the heating unit 12 to heat the water flowing through the pipe 16.

A base 24 is pivotally engaged to the solar panel 14 and is configured to support the solar panel 14 so that the solar panel 14 is selectively positionable relative to the base 24 to orient the solar panel 14 relative to the sun. For example, the base 24 could be mounted to a wall of the structure or to a footing proximate to the pipe 16. Additionally, as is known to those skilled in the art of photovoltaic panels, the solar panel 14 could be motorized so that it tracks the sun throughout the day.

A battery 26 is operationally engaged to the solar panel 14 and the heating unit 12. The battery 26 is rechargeable. The solar panel 14 is positioned to charge the battery 26 and the battery 26 is positioned to power the heating unit 12. A charge controller 28 is operationally engaged to the solar panel 14 and the battery 26. The charge controller 28 is positioned to regulate charging of the battery 26 by the solar panel 14.

A power unit 30 is operationally engaged to the battery 26 and the heating unit 12. The power unit 30 is configured to convert direct current supplied by the battery 26 to alternating current. The power unit 30 also is configured to adjust a frequency, a voltage, and an amperage of the alternating current. The power unit 30 thus is positioned to supply alternating current to the heating unit 12 at a frequency, a voltage, and an amperage sufficient to heat the water flowing through the pipe 16.

As shown in FIG. 1, a faucet 32 engaged to an end 34 of the pipe 16 is positioned to be turned to selectively open the pipe 16 so that the water flows therethrough.

In use, the solar panel 14 converts electromagnetic radiation impinging thereupon to an electrical current to charge the battery 26. The battery 26 supplies power to the inductor 18, which generates a magnetic field. The magnetic field induces the eddy currents within the tube 20 or the plate 22, which causes it to be heated. The heat from the tube 20 or the plate 22 is transferred through the pipe 16 to the water flowing through the pipe 16 so that hot water is available to a user via the faucet 32. The present invention is anticipated to be of particular use in areas where electricity is unavailable, unreliable, or expensive.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A solar powered water heating assembly and pipe combination comprising:
    a pipe in fluidic communication with water piping of a structure and extending externally from the structure;
    a faucet engaged to an end of the pipe outside of the structure, such that the faucet is positioned for being turned for selectively opening the pipe such that the water flows therethrough;
    a heating unit engaged to the pipe, wherein the heating unit is configured for heating of water flowing through the pipe; and
    a solar panel configured for converting electromagnetic radiation into an electrical current, the solar panel being operationally engaged to the heating unit, such that the solar panel is positioned for powering the heating unit for heating the water flowing through the pipe;
    wherein the heating unit comprises an inductor engaged to a tube, the tube being paramagnetic and in contact with the pipe, such that the inductor is positioned for generating a magnetic field for inducing eddy currents within the tube for heating thereof, the inductor and tube being positioned around the pipe outside of the structure such that the inductor is positioned between the structure and the faucet such that the tube is positioned for transferring heat to the pipe for heating the water flowing therethrough adjacent to the faucet.

2. The solar powered water heating assembly and pipe combination of claim 1, wherein the tube comprises iron.

3. The solar powered water heating assembly and pipe combination of claim 1, further including a base pivotally engaged to the solar panel and being configured for supporting the solar panel, such that the solar panel is selectively positionable relative to the base for orienting the solar panel relative to the sun.

4. The solar powered water heating assembly and pipe combination of claim 1, further including a battery operationally engaged to the solar panel and the heating unit, the battery being rechargeable, such that the solar panel is positioned for charging the battery, and such that the battery is positioned for powering the heating unit.

5. The solar powered water heating assembly and pipe combination of claim 4, further including a charge controller operationally engaged to the solar panel and the battery, such that the charge controller is positioned for regulating charging of the battery by the solar panel.

6. The solar powered water heating assembly and pipe combination of claim 4, further including a power unit operationally engaged to the battery and the heating unit, the power unit being configured for converting direct current supplied by the battery to alternating current, the power unit being configured for adjusting a frequency, a voltage, and an amperage of the alternating current, such that the power unit is positioned for supplying alternating current to the heating unit at a frequency, a voltage, and an amperage sufficient for heating the water flowing through the pipe.

7. A solar powered water heating assembly and pipe combination comprising:
    a pipe in fluidic communication with water piping of a structure and extending externally from the structure;
    a faucet engaged to an end of the pipe outside of the structure, such that the faucet is positioned for being turned for selectively opening the pipe such that the water flows therethrough;
    a heating unit integral to, or configured for being engaged to, the pipe, wherein the heating unit is configured for heating of water flowing through the pipe, the heating unit comprising an inductor engaged to a tube, the tube being paramagnetic and in contact with the pipe, such that the inductor is positioned for generating a magnetic field for inducing eddy currents within the tube for heating thereof, the inductor and tube being positioned around the pipe outside of the structure such that the inductor is positioned between the structure and the faucet, wherein the tube is configured for transferring heat to the pipe for heating the water flowing therethrough, the tube comprising iron;

a solar panel configured for converting electromagnetic radiation into an electrical current, the solar panel being operationally engaged to the heating unit, such that the solar panel is positioned for powering the heating unit for heating the water flowing through the pipe;

a base pivotally engaged to the solar panel and being configured for supporting the solar panel, such that the solar panel is selectively positionable relative to the base for orienting the solar panel relative to the sun;

a battery operationally engaged to the solar panel and the heating unit, the battery being rechargeable, such that the solar panel is positioned for charging the battery, and such that the battery is positioned for powering the heating unit;

a charge controller operationally engaged to the solar panel and the battery, such that the charge controller is positioned for regulating charging of the battery by the solar panel; and a power unit operationally engaged to the battery and the heating unit, the power unit being configured for converting direct current supplied by the battery to alternating current, the power unit being configured for adjusting a frequency, a voltage, and an amperage of the alternating current, such that the power unit is positioned for supplying alternating current to the heating unit at a frequency, a voltage, and an amperage sufficient for heating the water flowing through the pipe.

* * * * *